Patented Nov. 28, 1944

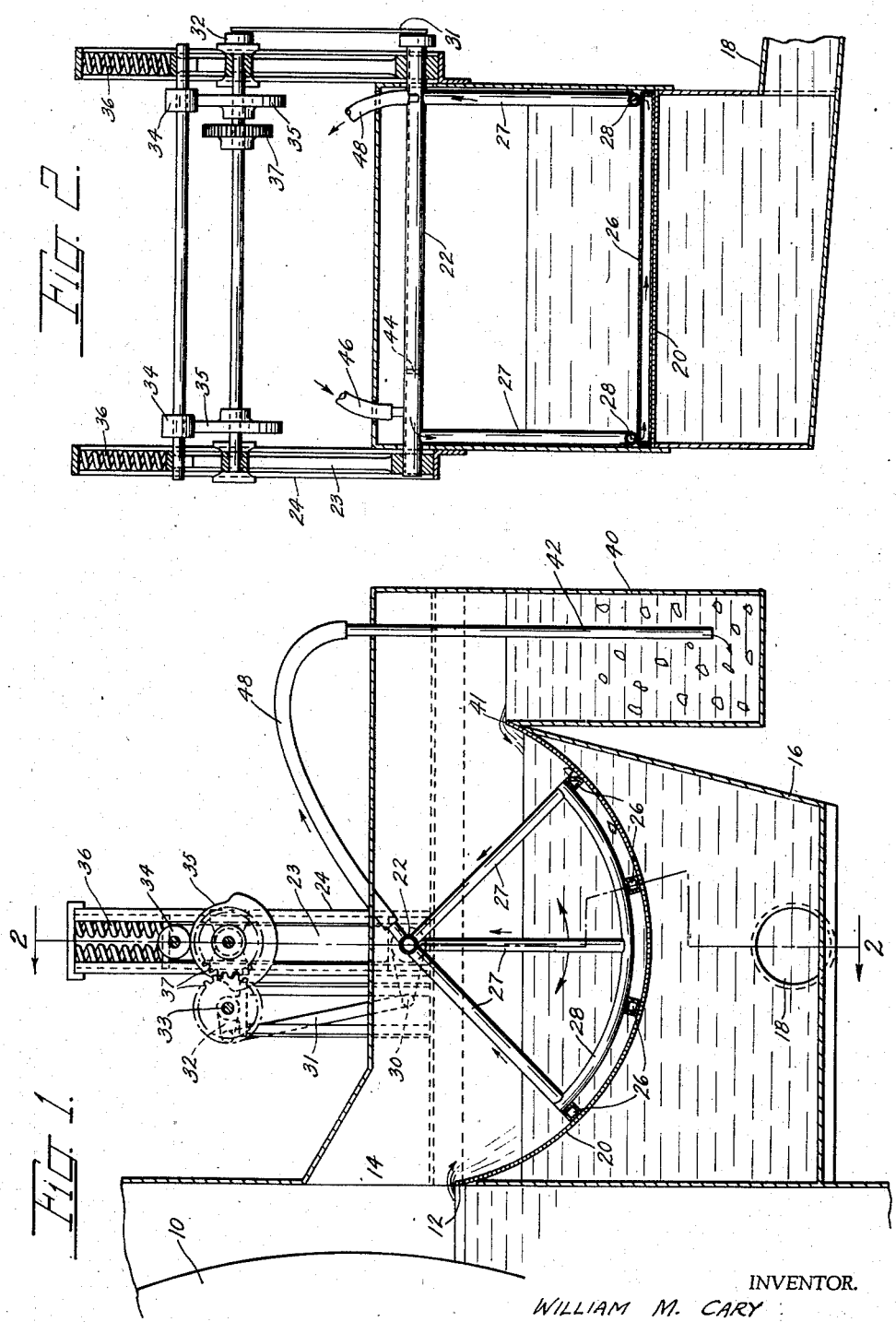

2,363,830

UNITED STATES PATENT OFFICE 2,363,830

AUTOMATIC SCRAPER FOR FILTER SCREENS

William M. Cary, Jacksonville, Fla., assignor to Combustion Engineering Company, Inc., New York, N. Y., a corporation of Delaware Application July 31, 1941, Serial No. 404,780

3 Claims. (Cl. 210—150.5)

This invention relates to chemical recovery apparatus and particularly to an improved method and apparatus for preparing black liquor preliminary to the recovery of sodium salts therefrom.

In making paper pulp chips of wood are treated with reagents such as sodium hydrate or sodium sulphide and after the chemical action has been completed in a digester the material is washed. The wash liquor, usually called black liquor, contains certain sodium salts which it is customary to reclaim in a recovery furnace. Before delivering the black liquor to the furnace it is passed through an evaporator to remove a large quantity of water therefrom so as to increase the solids content of liquor and render it suitable for use in a self sustaining process of chemical recovery within the furnace.

Such a process is disclosed in U. S. Patent No. 2,213,052, issued August 27, 1940, to Rosencrants and Hamm. The evaporator illustrated in the patent is known as the cascade type comprising revolving disks or plates that dip into the liquor and in their rotation expose a film of it to hot flue gases directed over the disks and above the surface of the body of liquor in the evaporator. The level of liquor in the evaporator is determined by a dam over which it flows into an overflow box. The latter is provided with a screen through which the liquor must pass in an uninterrupted flow on its way to pumps which deliver it to the recovery furnace.

The gases from the recovery furnace contain quantities of sodium sulphate and sodium carbonate. When these gases impinge on the wetted disks of the evaporator the gas streams are scrubbed but the chemical may not be removed uniformly over the scrubbing areas. Should stratified scrubbing occur, lumps are apt to form. Furthermore, the liquor in the evaporator is usually at a temperature not far above the point where congealing or jellying of the liquor can occur. Should there be any cold regions in the corners or recesses of the evaporator, small quantities of liquor will jell and form lumps. Where the liquor is splashed on the walls of the evaporator a solidified coating forms and at irregular periods small portions of the coating break off and find their way to the flow box. The lumps pass into and collect on the screen in the overflow box and have to be removed therefrom. Heretofore the lumps have been raked out by hand, which operation presented difficulties because when a bar or scraper at room temperature was placed in the flowing stream of liquor in the overflow box, a jellied mass formed on the relatively cold scraper seriously hampering the handling of the scraper and the removal of the lumps. With the capacity of recovery units increased from five to seven times those of the earlier units, lump removal obviously becomes a serious problem.

It is an object of this invention to provide a novel method and apparatus for automatically removing lumps from the overflow box of an evaporator of a chemical recovery unit or similar apparatus containing a liquor at a temperature where cooling will cause congealing and the formation of lumps.

The invention will best be understood upon consideration of the following detailed description of an illustrative embodiment thereof when read in conjunction with the accompanying drawing in which:

Figure 1 is an elevational view, partly in section, of the overflow box of an evaporator in which the invention is embodied; and Figure 2 is an end view corresponding to Figure 1, also partly in section.

Inasmuch as the construction of cascade evaporators is generally known, Figure 1 includes only part of one of the rotary disks 10 located adjacent the dam 12 over which the black liquor flows through the discharge opening 14 into the overflow box 16. From the overflow box 16 the black liquor, after passing through a filtering screen, is directed through a pipe 18 to pumps which deliver it to the recovery furnace. In carrying out the present invention, the filter screen 20 is curved to semi-circular shape and disposed with its concave face upwards. Located above the screen 20 in the position of the center of the circle of which the screen 20 forms an arc is a hollow shaft 22. This shaft is supported in bearings mounted at the lower portion of slide blocks 23 vertically movable in guideways 24. Carried by the shaft 22 near each end is a quadrant shaped frame between which are connected the scraper bars 26, the radial arms 27 of the frame being of such size that the scraper bars 26 contact and press against the screen 20. Attached to the shaft 22 are rocker arms 30 connected by rods 31 to crank arms 32 driven from any suitable motor (not shown) through a shaft 33. The arrangement is such that the scraper assembly is first rocked forwardly or to the right in Figure 1 through an angle substantially equal to the arc subtended by adjacent scraper bars 26 and then rearwardly to the same extent. In the forward movement of its oscillation the scraper assembly scrapes lumps from the screen 20 and discharges them into a dissolving tank 40 positioned immediately adjacent the upper outer edge or lip 41 of tank 16. Steam or hot water is supplied to the dissolving tank 40 through a pipe 42 at a temperature above that existing in the overflow box so as to assure that the lumps are completely dissolved. The liquor formed by dissolving these lumps flows back into the overflow tank 16 because the rear upper edge of the dissolving tank 40 immediately abuts the forward upper edge of the overflow tank 16.

The apparatus shown in the drawing is of the oscillating type, although the scraper assembly might be fully rotatable and constructed in the form of a cylindrical cage having a series of scraper bars that would be brought into contact with the screen 20 during their travel through the lower portion of the circle of rotation. In order to prevent lumps being trapped between adjacent scraper bars 26 and being carried back and forth over the screen 20 during the oscillation of the scraper assembly, means are provided for raising the scraper bars from contact with the screen during the rearward part of each oscillation cycle. As mentioned, the shaft 22 and hence the entire scraper assembly is supported in the slide blocks 23 which are reciprocable in the vertical guideways 24. Near their upper ends the slide blocks 23 are provided with rollers 34 in contact with cams 35 which are driven from the shaft 33 through suitable gearing 37. The contour of cams 35 is such that at the end of the forward cycle of oscillation of the scraper assembly it is lifted so that the scraper bars 26 are out of contact with the screen 20 as the cams 35 act through the rollers 34 to raise the slides 23 against the resistance of springs 36. When the scraper assembly completes its rearward movement the springs 36 act to move the slide blocks 23 downwardly and bring the scraper bars 26 into contact with the screen again as the low portion of the cams 35 riding beneath the roller 34 permits such movement.

Preferably, the parts of the scraper assembly are heated so that they may not cause lumps to form in the overflow tank 16 during their movement therein because of their being sufficiently cooler than the liquor to cause it to congeal. It is for this purpose that, as mentioned above, the shaft 22 is hollow. The radial arms 27, sector portions 28 of the quadrant frame and the scraper bars 26 are also hollow. The radial arms 27 communicate at one end with the interior of shaft 22 and at the other end with the arc sections 28 of the frame and these in turn communicate with the scraper bars 26 at each end of the latter. The interior of the hollow shaft 22 is divided into two sections by a partition 44 so that steam or hot water supplied through a connection 46 near one end of the shaft flows into the radial arms 27 at that end through the scraper bars 26, out of the other end of the latter and through the connected radial arms 27 to the chamber in shaft 22 at the other side of the partition 44. This chamber has a discharge connection 48 which may, as shown in Figure 1, be connected to the pipe 42 supplying steam or hot water to the dissolving tank 40.

The illustrated form of oscillating apparatus is advantageous because scraper bars 26, sector portions 28 and radial arms 27, all of which contact the solution, are kept immersed therein. I have found that the more and longer said parts are immersed, the less they will be subject to lumps adhering thereto, because lumps adhering to a steam heated part out of the solution will in time dry and bake onto said part.

Although the detailed structure of an illustrative form of apparatus for carrying out the invention has been described in detail herein, it is to be understood that there are many changes and variations that may be made without departing from the invention. Accordingly, it is desired and intended to include all such changes and variations within the scope of the appended claims.

What I claim is:

1. In apparatus for treating black liquor; an overflow box for receiving black liquor from an evaporator; an outlet for discharging liquor from said box; a screen disposed in the path of flow of liquor through said box for segregating lumps of material therefrom; a dissolving tank having an upper edge portion contiguous to and abutting an edge portion of said overflow box, whereby the liquid from said tank flows over said abutting edge portions of said tank and box into the latter; a scraper for removing lumps from said screen so arranged as to discharge lumps into said tank; and means for supplying a lump dissolving fluid to said tank.

2. In apparatus for concentrating black liquor, a chamber for receiving a mixture of black liquor and lumps of material solidified therefrom; an outlet for fluid from said chamber; a submerged screen disposed in said chamber in the path of fluid flowing to said outlet for separating the lumps from the liquid as it passes therethrough; a second chamber adjacent said receiving chamber provided with an opening therebetween adjacent the inlet side of said screen; scrapers associated with said screen; supporting means for said scrapers arranged to position the scrapers to move the lumps of material across the screen toward and to deliver them to said second chamber while said scrapers remain substantially continuously submerged in said liquor; means for operating said scrapers; heating means for dissolving said lumps in said second chamber, said opening forming an overflow passage for returning to the receiving chamber the liquid displaced in said second chamber by said lumps.

3. In apparatus for concentrating black liquor, a chamber for receiving a mixture of black liquor and lumps of material solidified therefrom; an outlet for fluid from said chamber; a submerged screen disposed in said chamber in the path of fluid flowing to said outlet for separating the lumps from the liquid as it passes therethrough; a second chamber adjacent said receiving chamber provided with an opening therebetween adjacent the inlet side of said screen; hollow scrapers associated with said screen; supporting means for said scrapers constructed and arranged to position the scrapers to move lumps of material across the screen toward and to deliver them to said second chamber while said scrapers remain substantially continuously submerged in said liquid; means for operating said scrapers; tubular heating means for dissolving said lumps in said second chamber; and means for passing a heating fluid through said scrapers and said heating means.

WM. M. CARY.